United States Patent
Lander et al.

(10) Patent No.: US 9,469,797 B2
(45) Date of Patent: Oct. 18, 2016

(54) PRESSURE-SENSITIVE ADHESIVES HAVING HIGH BIO-BASED CONTENT AND MACROMONOMERS FOR PREPARING SAME

(75) Inventors: Monique Roerdink Lander, Eagan, MN (US); Jiguang Zhang, Shanghai (CN); Steven J. Severtson, Lino Lakes, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 489 days.

(21) Appl. No.: 13/816,389

(22) PCT Filed: Aug. 11, 2011

(86) PCT No.: PCT/US2011/047445
§ 371 (c)(1),
(2), (4) Date: Jun. 30, 2014

(87) PCT Pub. No.: WO2012/021721
PCT Pub. Date: Feb. 16, 2012

(65) Prior Publication Data
US 2015/0210907 A1    Jul. 30, 2015

Related U.S. Application Data

(60) Provisional application No. 61/372,708, filed on Aug. 11, 2010.

(51) Int. Cl.
*C08G 63/08* (2006.01)
*C09J 167/04* (2006.01)
*C09J 133/08* (2006.01)

(52) U.S. Cl.
CPC .............. *C09J 167/04* (2013.01); *C08G 63/08* (2013.01); *C09J 133/08* (2013.01)

(58) Field of Classification Search
CPC ...... C08G 63/08; C09J 133/08; C09J 167/04
See application file for complete search history.

(56) References Cited

U.S. PATENT DOCUMENTS

| | | | |
|---|---|---|---|
| 5,852,117 A | 12/1998 | Schoenberg et al. | |
| 6,632,880 B2 | 10/2003 | Barsotti et al. | |
| 2002/0188056 A1* | 12/2002 | Wool | C08K 5/0008 524/556 |
| 2007/0066777 A1 | 3/2007 | Bzowej et al. | |
| 2009/0136774 A1 | 5/2009 | Onogi et al. | |
| 2009/0270003 A1 | 10/2009 | Anderson et al. | |
| 2010/0249315 A1* | 9/2010 | Morita | C08F 220/18 524/539 |

OTHER PUBLICATIONS

International Preliminary Report on Patentability; Feb. 21, 2013; World Intellectual Property Organization (WIPO) (International Bureau of); PCT/US2011/047445; 5 pages.
International Search Report and Written Opinion; Apr. 6, 2012; World Intellectual Property Organization (WIPO) (International Bureau of); PCT/US2011/047445; 9 pages.
Ishimoto et al; Biobased polymer system: miniemulsion of poly(alkyl methacrylate-graft-lactic acid)s; Biomacromolecules; Oct. 2009; 10:(10):2719-2723.

* cited by examiner

*Primary Examiner* — Alexa Neckel
*Assistant Examiner* — Marie Reddick
(74) *Attorney, Agent, or Firm* — Fish & Richardson P.C.

(57) ABSTRACT

A pressure sensitive adhesive composition comprising the polymerization product of: (A) a monomer selected from the group consisting of alkyl acrylates, alkyl methacrylates, and combinations thereof; and (B) a macromonomer comprising the reaction product of (a) a hydroxy-functional, ethylenically unsaturated monomer (e.g., an alkyl acrylate or methacrylate where the alkyl group is a $C_1$-$C_6$ alkyl group), (b) a bio-based monomer, and (c) a modifying monomer that lowers the Tg of the macromonomer relative to the Tg of the same macromonomer prepared in the absence of the modifying monomer.

25 Claims, 4 Drawing Sheets

US 9,469,797 B2

PRESSURE-SENSITIVE ADHESIVES HAVING HIGH BIO-BASED CONTENT AND MACROMONOMERS FOR PREPARING SAME

CROSS-REFERENCE TO RELATED APPLICATION

This application is a National Stage Application under 35 U.S.C. §371 and claims the benefit of International Application No. PCT/US2011/047445, filed Aug. 11, 2011, which claims priority to U.S. Application No. 61/372,708, filed Aug. 11, 2010. The disclosure of the foregoing application is hereby incorporated by reference in its entirety.

STATEMENT REGARDING GOVERNMENT FUNDING

This invention was made with government support under 09-JV-111111122-038 awarded by the Dept. of Agriculture through a subcontract with the United States Postal Service. The government has certain rights in the invention.

TECHNICAL FIELD

This invention relates to pressure sensitive adhesives incorporating bio-based monomers.

BACKGROUND

Acrylic polymers find widespread application in coatings, paints, and adhesives. They are typically prepared using petroleum-derived monomers. Therefore, incorporation of bio-based resources as a substitute for petroleum-derived materials could make a significant contribution in the development of sustainable products. Bio-based materials that are considered for replacing petroleum-derived monomers are typically derived from soybean and other vegetable oils (fatty acids, triglycerides, and polyols), and from starches and sugars (e.g., lactides and caprolactones). However, these monomers cannot participate in the aqueous polymerization methods that are typically used to prepare acrylate polymers without chemical modification to introduce a reactive double bond that can undergo radical polymerization. To this end, macromonomers from acrylated or hydroperoxidized fatty acids and triglyceride derivatives have been used in mini-emulsion polymerizations to prepare waterborne resin coatings. Similarly, acrylated oleate monomers derived from sunflower oil triglycerides have been copolymerized with methyl methacrylate and 2-ethylhexyl acrylate (EHA), and showed potential as pressure-sensitive adhesives (PSAs).

The ring-opening of L-lactide by 2-hydroxyethyl methacrylate (HEMA) has been used to prepare acrylated poly (lactic acid) ("PLA") macromonomers for radical copolymerization. For example, Ishimoto et al., *Biomacromolecules* 2009, 10, (10), 2719-2723 used this method to prepare copolymers of acrylated PLA macromonomers and n-butyl methacrylate (BMA) in a mini-emulsion process. Polyacrylates with 34 wt % biomass contents were achieved, where "biomass content" refers to the percentage of the macromonomer, minus HEMA, incorporated in the polyacrylate polymerization product. However, higher biomass incorporation was not possible.

SUMMARY

Described herein is a pressure sensitive adhesive composition comprising the polymerization product of: (A) a monomer selected from the group consisting of alkyl acrylates, alkyl methacrylates, and combinations thereof; and (B) a macromonomer comprising the reaction product of (a) a hydroxy-functional, ethylenically unsaturated monomer (e.g., a hydroxy alkyl acrylate or methacrylate where the alkyl group is a $C_1$-$C_6$ alkyl group), (b) a bio-based monomer (e.g., a lactide), and (c) a modifying monomer. The modifying monomer, which may be a bio-based monomer such as caprolactone, lowers the Tg of the macromonomer relative to the same macromonomer prepared in the absence of the modifying monomer. In some embodiments, the polymerization product contains at least 35% by weight of the macromonomer minus the hydroxyl-functional, ethylenically unsaturated monomer, based upon the total weight of the polymerization product. In other embodiments, the polymerization product contains at least 40%, at least 50%, or at least 55% by weight of the macromonomer minus the hydroxy-functional ethylenically unsaturated monomer, based upon the total weight of the polymerization product. The pressure sensitive adhesive composition may include a tackifier.

The enhanced miscibility of the macromonomer in the (A) monomer, relative to macromonomers that lack the modifying monomer, enables the preparation of polymerization products that contain relatively high amounts of the macromonomer. The process may also be used to prepare macromonomers incorporating bio-based monomers other than lactides and lactones.

The details of one or more embodiments of the invention are set forth in the accompanying drawings and the description below. Other features, objects, and advantages of the invention will be apparent from the description and drawings, and from the claims.

DESCRIPTION OF DRAWINGS

In FIGS. 4A, B, D, and E, the number of ε-caprolactone units changes, while the number of lactic acid units remains constant. In FIGS. 4C and F, the number of lactic acid units changes, while the number of ε-caprolactone units remains constant.

Like reference symbols in the various drawings indicate like elements.

DETAILED DESCRIPTION

The pressure sensitive adhesive compositions are the polymerization product of: (A) a monomer selected from the group consisting of alkyl acrylates, alkyl methacrylates, and combinations thereof; and (B) a macromonomer comprising the reaction product of (a) a hydroxy-functional, ethylenically unsaturated monomer (e.g., a hydroxy alkyl acrylate or methacrylate where the alkyl group is a $C_1$-$C_6$ alkyl group), (b) a bio-based monomer (e.g., a lactide), and (c) a modifying monomer. The modifying monomer may be a bio-based monomer such as caprolactone. It lowers the Tg of the macromonomer relative to the same macromonomer prepared in the absence of the modifying monomer. The polymerization product preferably contains at least 35%, at least 40%, at least 50%, or at least 55% by weight of the macromonomer minus the hydroxy-functional, ethylenically unsaturated monomer, based upon the total weight of the polymerization product. Suitable processes for preparing the polymerization product include aqueous-based polymerization processes such as emulsion and mini-emulsion polymerization processes.

Examples of suitable (A) monomers include $C_1$-$C_{12}$ alkyl acrylates, alkyl methacrylates, and combinations thereof. Specific examples include n-butyl acrylate, n-butyl methacrylate, 2-ethyl hexyl acrylate, and 2-ethyl hexyl methacrylate.

Examples of suitable hydroxyl alkyl acrylates and methacrylates for the macromonomer include acrylates and methacrylates capable of participating in a ring-opening polymerization of the lactide and lactone monomers. Specific examples include 2-hydroxy ethyl acrylate, 2-hydroxy ethyl methacrylate, and combinations thereof.

Examples of suitable lactides include D-lactide, L-lactide, and D,L-lactide.

Examples of suitable lactones include ε-caprolactone.

EXAMPLES

Figure 1:
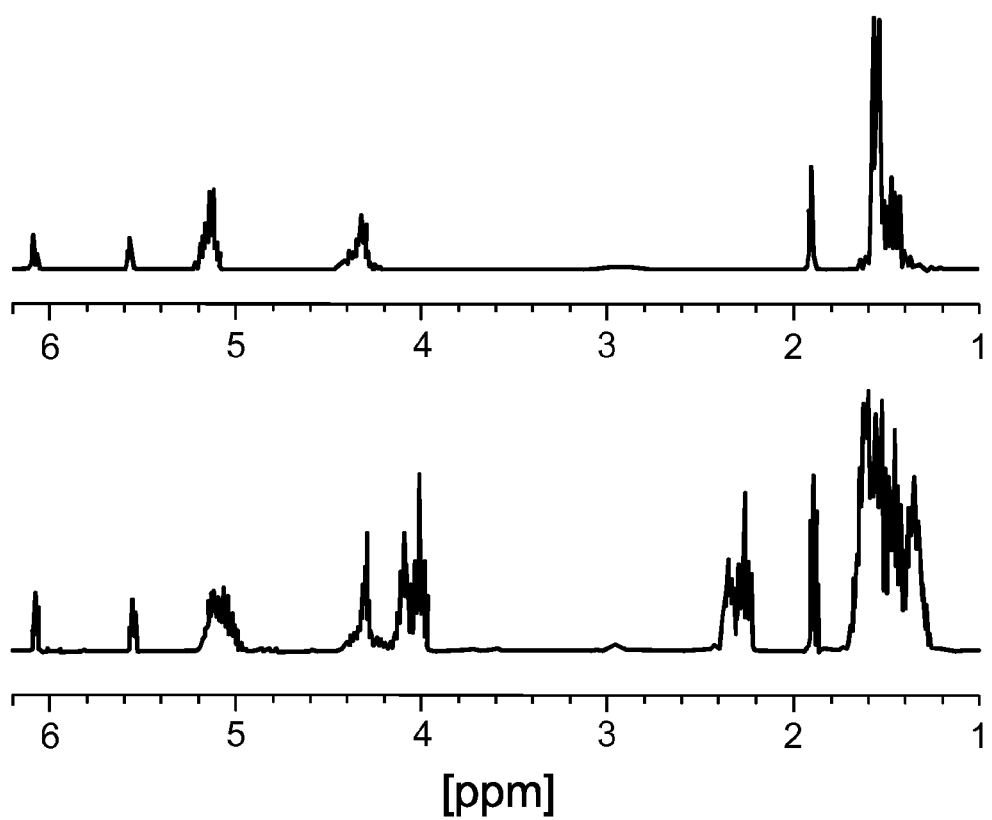
FIG. 1 contains $^1$H-NMR spectra for two macromonomers: L6 (top spectrum) and L8C4 (bottom spectrum).

Macromonomers (MMs) of L-lactide and copolymers of L-lactide and ε-caprolactone were prepared by HEMA-initiated ring-opening polymerization (ROP). During the ROP of low molar mass macromonomers, HEMA homopolymerization took place as a side reaction when typical catalyst concentrations (<1 mol %) were used, which resulted in insoluble end products. An increase in the amount of catalyst and employing a short reaction time prevented the side reaction from occurring and yielded soluble products that were free of acrylate homopolymers. Lower catalyst amounts and longer reaction times were acceptable in the synthesis of the higher molar mass macromonomers. The composition and molar mass of the macromonomers were determined from $^1$H-NMR, based on the ratio between the peaks at 4.3 ppm (HEMA, +O—($CH_2$)$_2$—O—) and 5.1 ppm (PLA, —COO—C(H)$CH_3$—) (FIG. 1). The methylene protons linked to the ester groups of ε-caprolactone, appear at 2.3 and 4.0 ppm and correspond to two connection sequences in the random copolymer. The compositions calculated based on the NMR spectra were consistent with the feeding ratio of L-lactide to HEMA, indicating that the reaction proceeded to completion. Table 1 lists the composition of the macromonomers (MMs), their glass transition temperatures, and their number average ($M_n$) molecular weights.

TABLE 1

Composition, Glass Transition Temperature ($T_g$), and Number-Average Molecular Weight ($M_n$) for Biomass Macromonomers

| Composition[a] | $T_g$ (° C.) | $M_n$ | Composition[a] | $T_g$ (° C.) | $M_n$ |
|---|---|---|---|---|---|
| $_L$-L6 | −26 | 562 | $_{D, L}$-L8 | −21 | 706 |
| $_L$-L8 | −20 | 706 | $_{D, L}$-L8C8 | −46 | 1618 |
| $_L$-L12 | −8 | 994 | $_{D, L}$-L8C5 | −39 | 1276 |
| $_L$-L8C10 | −52 | 1846 | $_{D, L}$-L8C3 | −29 | 1048 |
| $_L$-L8C4 | −34 | 1162 | $_{D, L}$-L10C10 | −52 | 1990 |
| $_L$-L8C3 | −33 | 1048 | $_{D, L}$-L10C5 | −28 | 1420 |
| $_L$-L10C10 | −52 | 1990 | $_{D, L}$-L14C10 | −33 | 2278 |
| $_L$-L10C5 | −26 | 1420 | | | |
| $_L$-L14C10 | −32 | 2278 | | | |
| $_L$-L16C10 | −28 | 2422 | | | |

[a]The macromonomer (MM) composition, L-L6, D-L6 and D, L-L6 denotes 6 repeat units of L- and D-lactic acid and a racemic mixture, respectively. Similarly, L8C4 denotes 8 repeat units of lactic acid and 4 repeat units of ε-caprolactone. The compositions were determined based on $^1$H-NMR.

The addition of a few repeat units in the MM (from 6 to 12 repeat units) caused a significant increase in the glass transition temperature ($T_g$) and a change from a viscous liquid to a waxy solid for 12 repeat units. Although L6 was miscible with BMA and EHA, a homogeneous mixture of L8 and either BMA or EHA could only be obtained upon moderate heating and sonication. L12 could not be mixed with BMA, EHA, or other acrylate monomers and, therefore, could not be used in mini-emulsion polymerization. Poly(caprolactone) is a liquid polymer at room temperature ($T_g$=−60° C.). A copolymer of repeat units of the ε-caprolactone monomer and the semi-crystalline lactide was therefore expected to have a low $T_g$, due to the flexibility of the aliphatic ε-caprolactone chain, and the suppression of the crystallization of the lactide by the statistical incorporation of another monomer. The copolymer MM of lactide and ε-caprolactone was a viscous liquid with a $T_g$ of −38° C. and was fully miscible with acrylate monomers.

The presence of a single Tg in the MMs indicates a random incorporation of lactide and ε-caprolactone into the macromonomer, which was corroborated by 2D $^1$H NMR (gradient correlation spectroscopy). The absence of crystallization in the MMs also supported the random incorporation of the two monomers into the macromonomer.

FIGS. 4A-4F show differential scanning calorimetry (DSC) thermal scans of macromonomers to illustrate the effect of macromonomer composition and molecular weight on the Tg. The MM Tg increases with increasing molecular weight. Similarly, higher ratios of lactide in the macromonomer increase the Tg as well. Conversely, higher amounts of caprolactone decrease the Tg. There is no significant difference in Tg between the two enantiomeric forms of lactide in the MMs.

Macromonomers were then copolymerized with BMA and EHA in a mini-emulsion polymerization process, resulting in the copolymers shown in Scheme 1:

Scheme 1: Copolymers of BMA (1) and EHA (2) with biomass macromonomers.

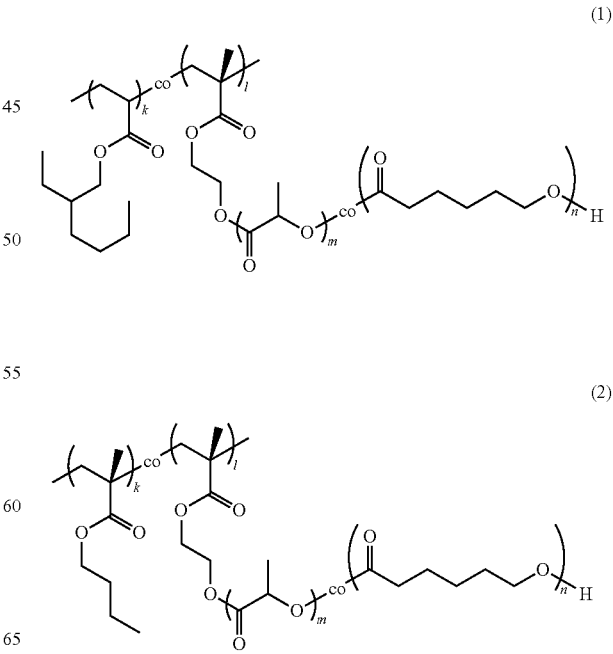

The compositions of the final latexes are listed in Table 2.

TABLE 2

Biomass acrylate compositions and glass transition temperatures ($T_g$).

| Sample | EHA/BM A (g) | MM (g) | Biomass (wt %)[a] | $T_g$ (° C.) |
|---|---|---|---|---|
| P(BMA-co-L6) | 5 | 5 | 39 | 24 |
| P(BMA-co-L8C4) | 5 | 5 | 45 | −22 |
| P(EHA-co-L6) | 10 | 7 | 45 | 19 |
| P(EHA-co-L8) | 7 | 3 | 57 | 9 |
| P(EHA-co-L8C4) | 5 | 5 | 44 | −47 |

[a]The biomass content was determined from the initial monomer feed, since Raman spectroscopy indicated near 100% conversions of the polymerization reaction.

Another factor that is important in the miscibility of the acrylate monomers and the macromonomers is the macromonomer concentration in the oil phase. The viscosity of the oil phase in the emulsion increased with increasing amounts of MM, eventually resulting in phase separation of the acrylate and macromonomer. An extra sonication step prior to emulsion formation was used to obtain a homogeneous oil phases for all of the compositions listed in Table 2. Homogeneous mixtures could not be obtained for compositions with macromonomer:acrylate monomer ratios exceeding 1. The latexes prepared with the copolymer MM approach contained 40-60 wt % biomass.

Various macromonomers were also co-polymerized with EHA and, optionally, styrene (Sty) in a mini-emulsion process. The resulting latex adhesives contained about 40-60 wt. % biomass. The results are shown in Table 3. The designation "T" refers to a tackified composition. The tackifier was a rosin tackifier commercially available under the designation "Aquatac 6085" from Arizona Chemical (Dover, Ohio).

TABLE 3

Composition of Semi-synthetic PSA Formulations

| Sample | MM (wt %) | Crosslinker (wt %) | Tackifier (wt %)* | Monomer 2 | Monomer 3 |
|---|---|---|---|---|---|
| 1 | $_{DL}$-L8C3 (50) | 0.1 | 0 | EHA (50) | |
| 2 | $_L$-L8C3 (50) | 0.1 | 0 | EHA (50) | |
| 3 | $_L$-L10C4 (50) | 0.1 | 0 | EHA (50) | |
| 4 | $_L$-L10C5 (50) | 0.1 | 0 | EHA (50) | |
| 5 | $_L$-L10C6 (50) | 0.2 | 0 | EHA (50) | |
| 6 | $_L$-L10C10 (50) | 0.1 | 0 | EHA (50) | |
| 7 | $_{DL}$-L8C1 (50) | 0.1 | 0 | EHA (50) | |
| 8 | $_L$-L10C4 (50) | 0.5 | 0 | EHA (50) | |
| 9 | $_L$-L10C6 (50) | 0.5 | 0 | EHA (50) | |
| 10 | $_{DL}$-L8C8 (50) | 1.0 | 0 | EHA (50) | |
| 11 | $_L$-L10C3 (50) | 1.0 | 0 | EHA (50) | |
| 12 | $_L$-L10C4 (50) | 1.0 | 0 | EHA (50) | |
| 12T | $_L$-L10C4 (50) | 1.0 | 30 | EHA (50) | |
| 13 | $_L$-L10C6 (50) | 1.0 | 0 | EHA (50) | |
| 13T | $_L$-L10C6 (50) | 1.0 | 30 | EHA (50) | |
| 14 | $_L$-L10C6 (40) | 1.0 | 0 | EHA (40) | St (20) |
| 14T | $_L$-L10C6 (40) | 1.0 | 30 | EHA (40) | St (20) |

*provided on a product basis. Tackifier solution was found to have a solids content of 60%.

Reaction Conversion.

Figure 2A:
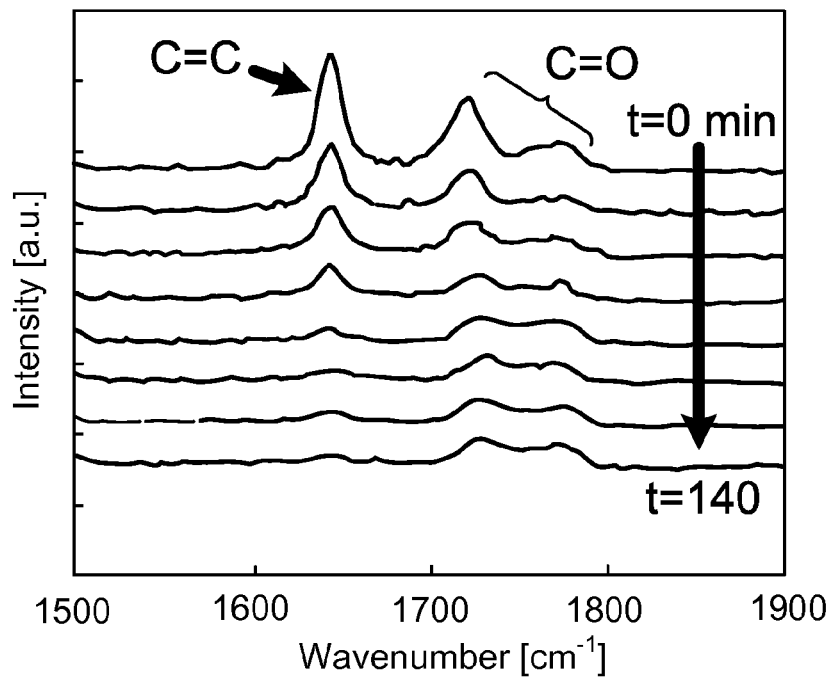
FIG. 2A contains Raman spectra of the mini-emulsion polymerization of P(BMA-co-L8) at various time intervals.
Figure 2B:
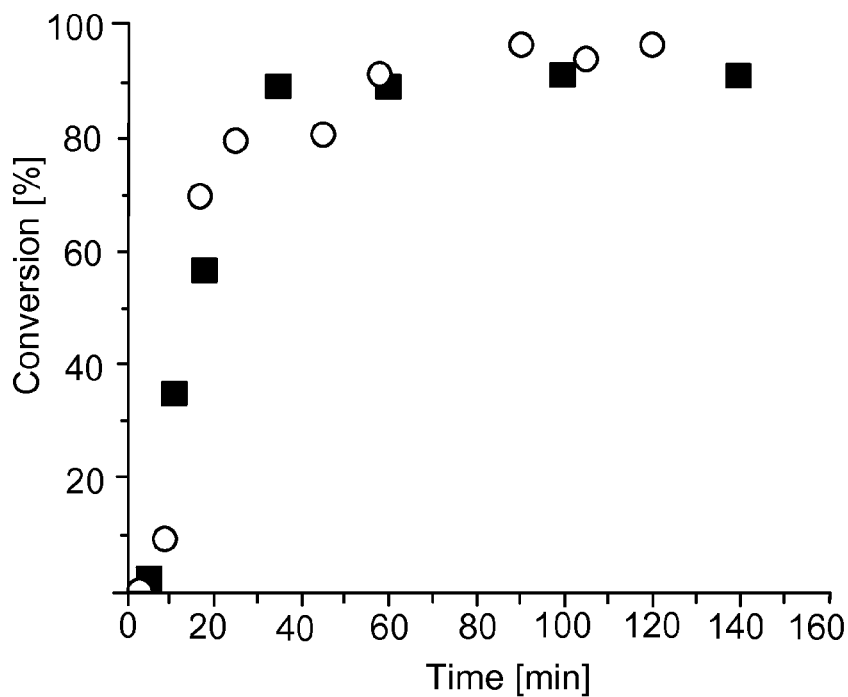
FIG. 2B is a graph illustrating the conversion of P(BMA-co-L8) (circles) and P(BMA-co-L8C4) (squares) based upon the Raman spectra shown in FIG. 2A.

Conventional methods for monitoring the conversion of monomer, such as gravimetry, which rely on evaporation of the unreacted species, are not applicable to mini-emulsion polymerizations, due to the presence of both volatile (acrylate) and non-volatile (macro)monomers. Confocal Raman microscopy (CRM) has been used to determine the composition of a polymer film quantitatively. The fraction of a given functional group can be determined by comparing its characteristic peak with a reference peak. The same setup was used to follow the conversion of the miniemulsion polymerizations by analyzing aliquots of the initial emulsion and during the reaction. No additional sample preparation was required and measurements were fast, taking only a few seconds to produce spectra with sufficient signal-to-noise ratios. The ratios of the peak intensities of the carbonyl groups at 1724 cm$^{-1}$ (HEMA) and at 1768 cm$^{-1}$ (PLA) were 6, 8 and 12 for L6, L8 and L12, respectively, corroborating the composition determined by $^1$H-NMR. The peak at 1768 cm$^{-1}$ for the L8C4 macromonomer is caused by the carbonyl groups of both lactic acid and ε-caprolactone. The conversion of the mini-emulsion reactions were followed by monitoring the disappearance of the C=C peak at 1642 cm$^{-1}$, as shown for the reaction between macromonomer L8 and BMA (FIG. 2A). The polymerization kinetics is fast, as is typical for mini-emulsions, and the reactions proceeded to 90% conversion within the first hour, approaching full conversion after 2 hours. The reaction conversion for the mini-emulsions of L8 and L8C4 with BMA are both shown in FIG. 2B.

The solids contents of the latexes were around 25 wt %, which is a typical value for macromonomer emulsions without additional polymeric co-surfactants. The particles were characterized with TEM and were spherical with diameters of 100-200 nm (determined with DLS), which is a typical size for mini-emulsion latex particles.

Film Properties.

Figure 3:
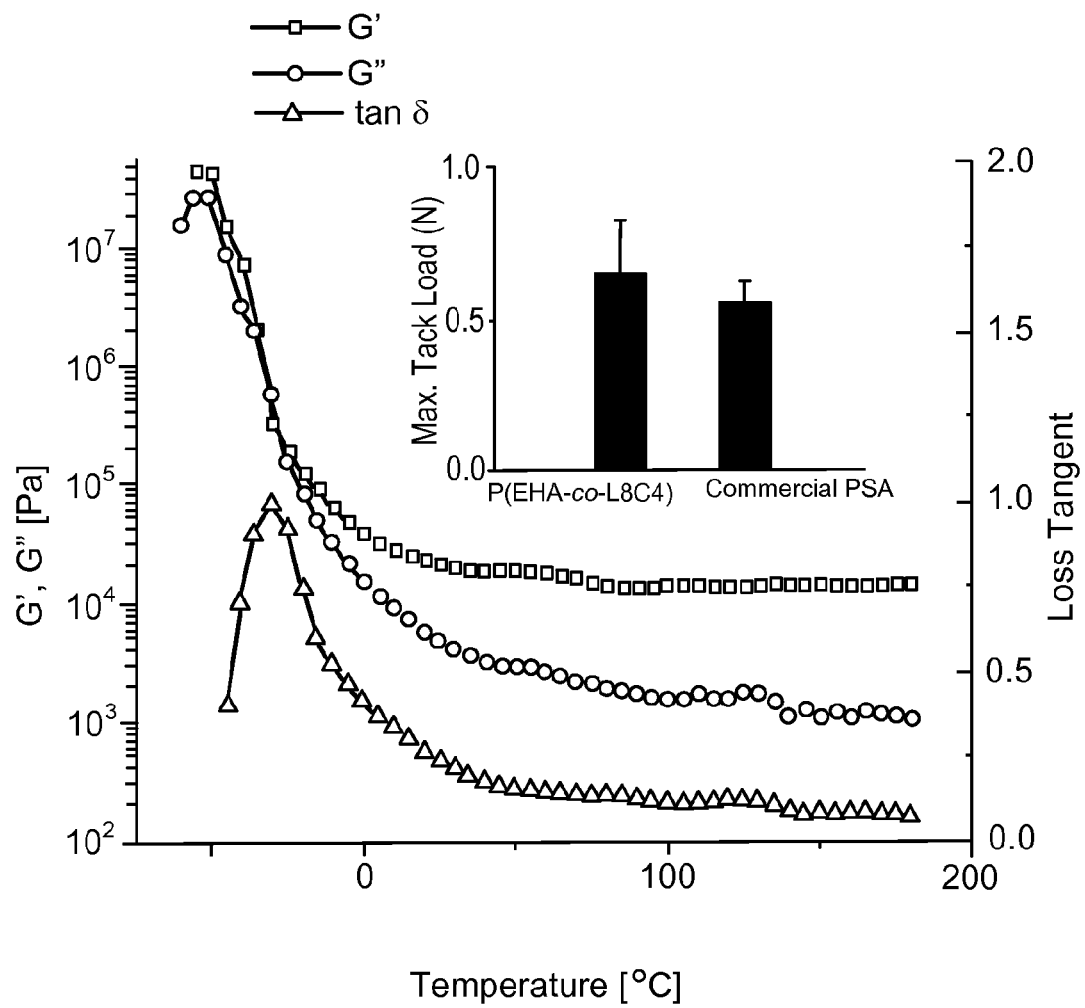
FIG. 3 illustrates the storage modulus (G'), loss modulus (G"), and loss tangent as a function of temperature for a P(EHA-co-L8C4) film (1 Hz), and maximum tack load of P(EHA-co-L8C4) and a commercial PSA (inset).
Figure 4A:
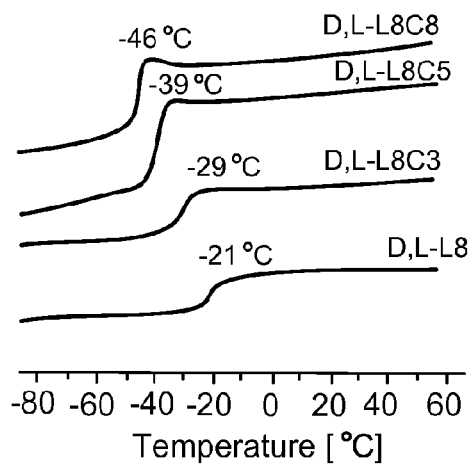
FIGS. 4A-4F are differential scanning calorimetry scans showing the effect of the composition of the macromonomer on the glass transition temperature for macromonomers containing D,L-lactide (4A-4C) and L-lactide (4D-4FA).
Figure 4D:
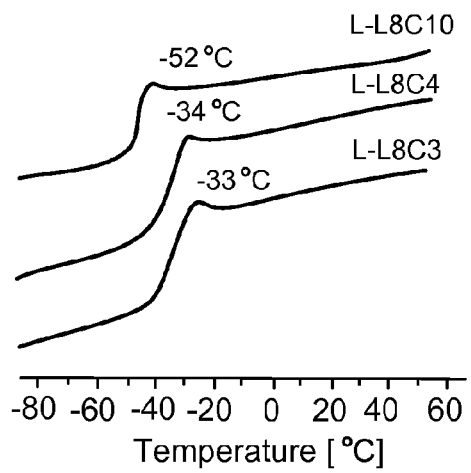
Figure 4B:
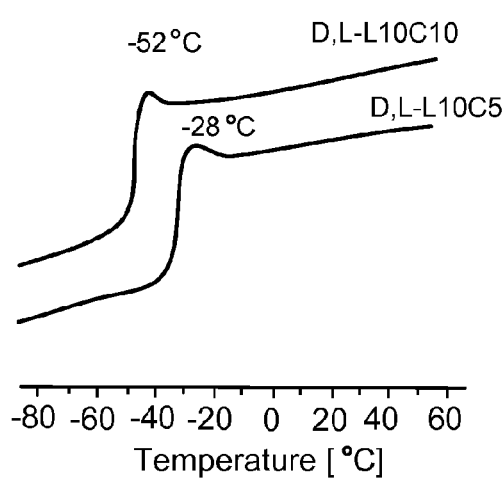
Figure 4E:
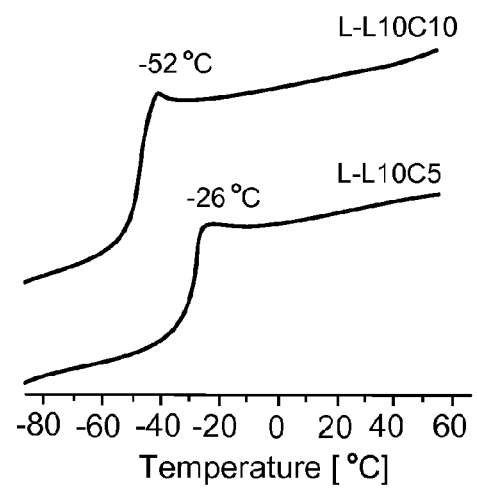
Figure 4C:
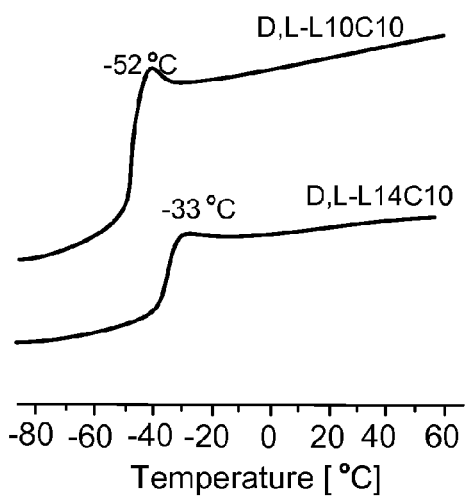
Figure 4F:
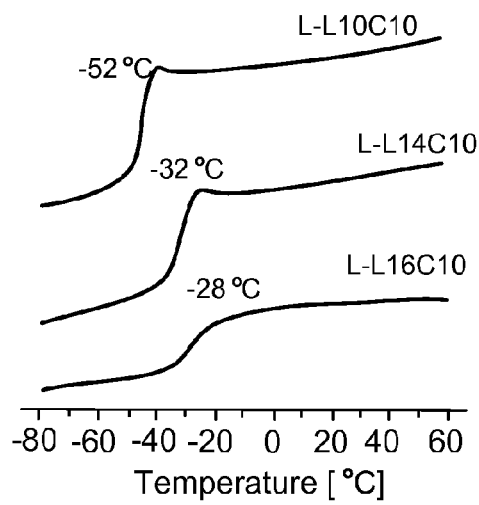

The adhesive character of the biomass-based polyacrylate films was investigated. After evaporation of water, both the glass transition temperatures and the temperature dependence of the storage and loss modules (G' and G", respectively) were measured. Both the low glass transition temperature of −47° C. and the dynamic mechanical properties of P(EHA-co-L8C4) films suggest adhesive properties. At room temperature, the storage modulus (FIG. 3) is well below 10$^5$ Pa, which indicates tackiness in PSAs according to the Dahlquist criterion. The adhesive properties of this PSA based on about 50 wt % EHA and 50 wt % biomass, such as glass transition, storage modulus, and tack compared well to commercial adhesives. For example, the maximum tack load is slightly higher for P(EHA-co-L8C4) when compared to a commercially available, removable PSA that is used in food packaging (inset FIG. 3) that also contains about 50 wt % EHA. Effectively, 50 wt % of n-BA was replaced with biomass-derived macromonomer, while retaining the adhesive properties.

Shear, 180° peel, and loop tack for films cast from the adhesives set forth in Table 3 were also measured. The values were measured as a function of the macromonomer composition (lactide/caprolactone ratio, molar mass) (L/C) and the degree of crosslinking, and compared against the adhesive performance of a commercially available, ultra removable PSA (PSA1) and commercially available, general purpose, permanent PSAs (PSA2 and PSA3). PSA1, PSA2, and PSA3 were obtained from Franklin Adhesives and Polymers (Columbus, Ohio) under the designations Covinax 210-00, Covinax 324-00, and Covinax 386-00, respectively. The results are set forth below in Table 4. The designation "s.d" refers to the standard deviation.

TABLE 4

Performance Properties for Semi-synthetic PSAs

| Sample | Shear (min) | s.d. | Peel (lbf) | s.d. | Loop tack (lbf) | s.d. |
|---|---|---|---|---|---|---|
| 1 | 0.508 | 0.080 | 0.252 | 0.361 | 0.481 | 0.126 |
| 2 | 0.924 | 0.270 | 0.193 | 0.064 | 0.556 | 0.190 |
| 3 | 1.475 | 0.459 | 0.429 | 0.084 | 1.220 | 0.310 |
| 4 | 0.150 | 0.032 | 0.051 | 0.021 | 0.323 | 0.067 |
| 5 | 0.450 | 0.179 | 0.108 | 0.026 | 0.870 | 0.131 |
| 6 | 0.083 | 0.026 | 0.020 | 0.005 | 0.191 | 0.057 |
| 7 | 1.142 | 0.229 | 0.216 | 0.069 | 0.720 | 0.109 |
| 8 | 1.667 | 0.339 | 0.701 | 0.149 | 1.151 | 0.236 |
| 9 | 1.158 | 0.474 | 0.239 | 0.027 | 1.090 | 0.147 |
| 10 | 0.317 | 0.093 | 0.739 | 0.865 | 0.830 | 0.202 |
| 11 | 2.158 | 0.377 | 0.640 | 0.081 | 0.610 | 0.175 |
| 12 | 3.017 | 0.403 | 0.361 | 0.102 | 0.631 | 0.091 |
| 12T | 41.142 | 8.917 | 0.909 | 0.370 | 0.720 | 0.190 |
| 13 | 3.283 | 0.584 | 0.864 | 0.158 | 1.039 | 0.136 |
| 13T | 44.067 | 10.785 | 0.896 | 0.180 | 0.767 | 0.153 |
| 14 | 18.167 | 5.490 | 0.521 | 0.265 | 0.289 | 0.097 |
| 14T | 88.867 | 10.326 | 0.507 | 0.241 | 0.188 | 0.062 |
| PSA1 | 93.183 | 68.923 | 0.204 | 0.106 | 0.628 | 0.146 |
| PSA2 | 99.833 | 29.422 | 1.783 | 0.289 | 1.255 | 0.309 |
| PSA3 | 367.080 | 89.058 | 1.111 | 0.139 | 0.988 | 0.102 |

As the data in Table 4 demonstrates, the peel and loop tack for the biomass latex adhesives are comparable to the values of the commercial PSAs. While the loop tack appears largely independent of the macromonomer composition and the degree of crosslinking, the 180° peel decreases slightly with increasing molecular weight of the MM, and increases slightly with increasing degree of crosslinking. The shear strength was more strongly affected by changes in MM composition and crosslinking. Shear increased with increasing amount of L/C and degree of crosslinking, but decreased as the MM molar mass increased.

All of the biomass latex adhesives consisted of 50 wt. % MM and 50 wt. % 2-EHA, except for one sample, which contained 45 wt. % MM, 45 wt. % 2-EA, and 10 wt. % styrene (Sample 14). In this sample, the shear strength increased significantly by incorporating small amounts of styrene, which acts as a "hard" monomer in the copolymer backbone.

A number of embodiments of the invention have been described. Nevertheless, it will be understood that various modifications may be made without departing from the spirit and scope of the invention. For example, the macromonomer could be prepared using bio-based monomers other than lactides and lactones. Accordingly, other embodiments are within the scope of the following claims.

What is claimed is:

1. A macromonomer comprising the ring-opening reaction product of (a) a hydroxy-functional, ethylenically unsaturated monomer, (b) a bio-based monomer, and (c) a modifying monomer that lowers the Tg of the macromonomer relative to the Tg of the same macromonomer prepared in the absence of the modifying monomer, wherein monomers (a), (b), and (c) are different from each other.

2. The macromonomer according to claim 1 wherein the hydroxy-functional, ethylenically unsaturated monomer comprises a hydroxy alkyl acrylate or methacrylate where the alkyl group is a $C_1$-$C_6$ alkyl group.

3. The macromonomer according to claim 2 wherein the hydroxy alkyl acrylate or methacrylate is selected from the group consisting of 2-hydroxy ethyl acrylate, 2-hydroxy ethyl methacrylate, and combinations thereof.

4. The macromonomer according to claim 1 wherein the bio-based monomer comprises a lactide.

5. The macromonomer according to claim 4 wherein the lactide is selected from the group consisting of L-lactide, D-lactide, and D,L-lactide.

6. The macromonomer according to claim 1 wherein the modifying monomer comprises a bio-based monomer.

7. The macromonomer according to claim 6 wherein the modifying monomer comprises a lactone.

8. The macromonomer according to claim 7 wherein the lactone comprises ϵ-caprolactone.

9. A pressure sensitive adhesive composition comprising the polymerization product of: (A) a monomer selected from the group consisting of alkyl acrylates, alkyl methacrylates, and combinations thereof; and (B) a macromonomer comprising the reaction product of (a) a hydroxy-functional, ethylenically unsaturated monomer, (b) a bio-based monomer, and (c) a modifying monomer that lowers the Tg of the macromonomer relative to the Tg of the same macromonomer prepared in the absence of the modifying monomer, wherein monomers (a), (b), and (c) of the macromonomer are different from each other.

10. The pressure sensitive adhesive composition according to claim 9 wherein the hydroxy-functional, ethylenically unsaturated monomer comprises a hydroxy alkyl acrylate or methacrylate where the alkyl group is a $C_1$-$C_6$ group.

11. The pressure sensitive adhesive composition according to claim 10 wherein the hydroxy alkyl acrylate or methacrylate is selected from the group consisting of 2-hydroxy ethyl acrylate, 2-hydroxy ethyl methacrylate, and combinations thereof.

12. The pressure sensitive adhesive composition according to claim 9 wherein the bio-based monomer comprises a lactide.

13. The pressure sensitive adhesive composition according to claim 12 wherein the lactide is selected from the group consisting of L-lactide, D-lactide, and D,L-lactide.

14. The pressure sensitive adhesive composition according to claim 9 wherein the modifying monomer comprises a bio-based monomer.

15. The pressure sensitive adhesive composition according to claim 14 wherein the modifying monomer comprises a lactone.

16. The pressure sensitive adhesive composition according to claim 15 wherein the lactone comprises ϵ-caprolactone.

17. The pressure sensitive adhesive composition according to claim 9, wherein the polymerization product contains at least 35% by weight of the macromonomer minus the hydroxy-functional, ethylenically unsaturated monomer, based upon the total weight of the polymerization product.

18. The pressure sensitive adhesive composition according to claim 9 wherein the polymerization product contains at least 40% by weight of the macromonomer minus the hydroxy-functional, ethylenically unsaturated monomer, based upon the total weight of the polymerization product.

19. The pressure sensitive adhesive composition according to claim 9 wherein the polymerization product contains at least 50% by weight of the macromonomer minus the hydroxy-functional, ethylenically unsaturated monomer, based upon the total weight of the polymerization product.

20. The pressure sensitive adhesive composition according to claim 9 wherein the polymerization product contains at least 55% by weight of the macromonomer minus the hydroxy-functional, ethylenically unsaturated monomer, based upon the total weight of the polymerization product.

21. The pressure sensitive adhesive composition according to claim 9 wherein the (A) monomer is selected from the group consisting of $C_1$-$C_{12}$ alkyl acrylates, alkyl methacrylates, and combinations thereof.

22. The pressure sensitive adhesive composition according to claim 21 wherein the (A) monomer comprises n-butyl acrylate.

23. The pressure sensitive adhesive composition according to claim 21 wherein the (A) monomer comprises 2-ethylhexyl acrylate.

24. The pressure sensitive adhesive composition according to claim 9 wherein the composition further comprises a tackifier.

25. The pressure sensitive adhesive composition according to claim 9 wherein the composition comprises the polymerization product of the (A) monomer, the (B) macromonomer, and styrene.

* * * * *